United States Patent Office 3,091,884
Patented June 4, 1963

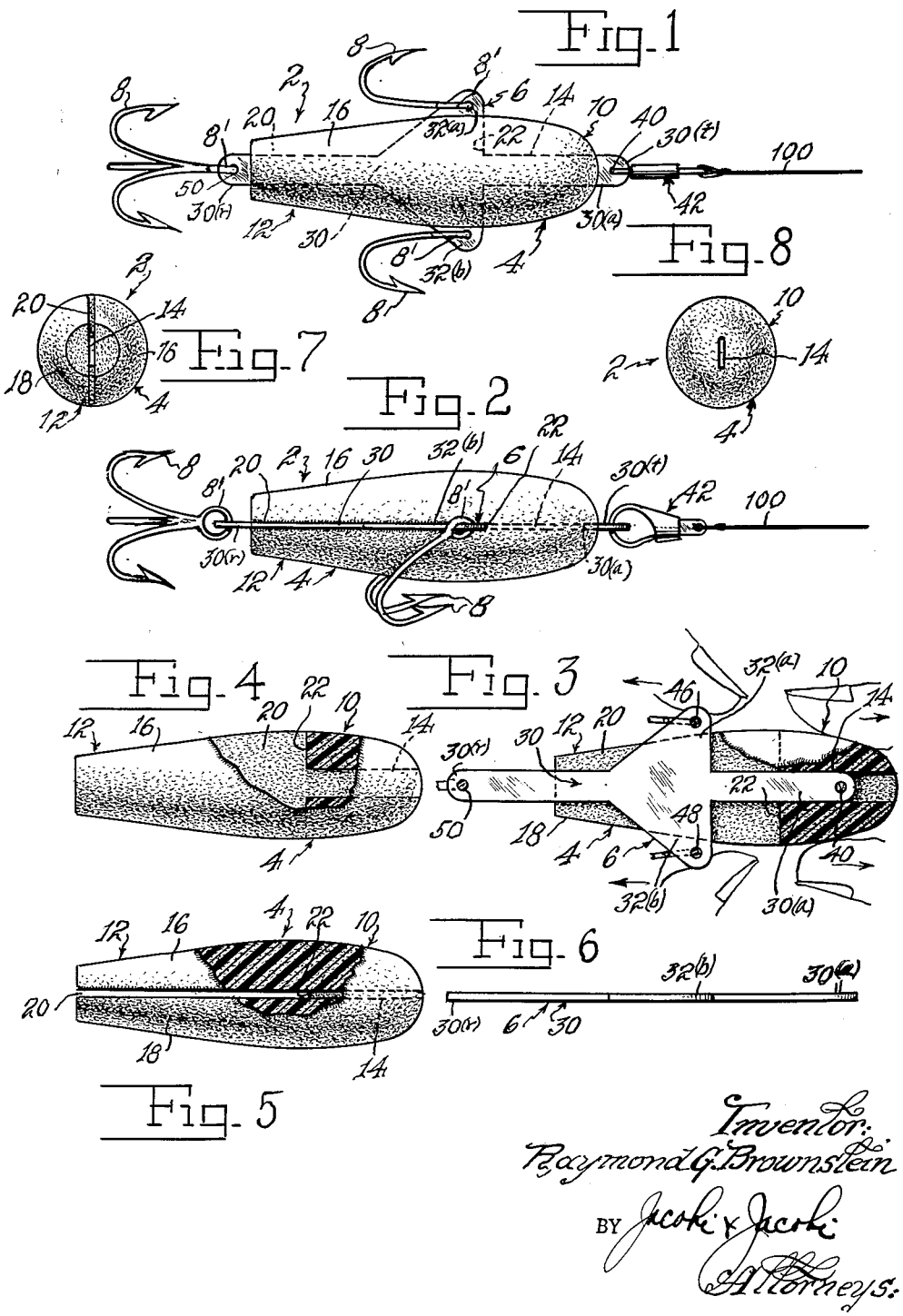

3,091,884
FISH LURE
Raymond G. Brownstein, 300 Fountain Ave.,
Ellwood City, Pa.
Filed July 10, 1961, Ser. No. 122,873
3 Claims. (Cl. 43—42.09)

This invention relates to the art of artificial fishing bait, and more particularly to fishing lures, or as they are sometimes called "plugs."

Various types of fishing lures have heretofore been developed. Some of such prior lures take the form of a solid body portion having fish hooks directly attached thereto by means of screws, projecting eyes, or the like. Other lures heretofore developed comprise a body portion adapted to enclose a fish hook harness fixed therein. Still other forms of lures incorporate a fish hook harness, and a body portion detachably secured thereto and cooperating therewith.

Within the broad classes of different types of lures as outlined in the preceding paragraph, there exists specific developments which are designed to provide efficiency in use, and/or saving of expense in manufacture. While each different type of construction heretofore suggested has advantages in particular applications, and while each such type may operate satisfactorily under limited conditions, there remains a need for a fish lure which is dependable in operation under the most adverse conditions, and which in addition provides for the utilization of a single fish hook harness and a plurality of "lure bodies" adapted to be used interchangeably with such harness whereby various lure assemblies are available to a fisherman for use under differing conditions which may be experienced. Of course, the ability of the lure to attract fish thereto is an important factor, and thus the aforesaid need further includes the requirement of providing an "attractive power" for the prey.

The present invention realizes the need described hereinabove, and has as its primary object the provision of an improved fish lure comprising a fish hook harness having fish hooks carried thereon, and a body portion readily inserted on and removed from the harness, and so designed that it is attractive to the fish and durable in operation under the most taxing conditions.

Still further, yet more specific objects of the present invention are: (a) to provide a fish lure conforming with the preceding objects, and in addition being inexpensive in manufacture; (b) to provide such a fish lure wherein the fish hooks, are so disposed in the assembled unit as to provide for maximum "fish catching" efficiency; (c) to provide such a fish lure wherein the body portion can be readily mounted on the harness, or wherein the harness can be readily mounted in the body portion without the necessity of manipulating either the harness or the body portion to obtain coupling of the same together; (d) to provide such a fish lure wherein fixing of the body portion to the fish hook harness thereof is achieved by means of inserting a suitable fastener through an aperture in the harness, which aperture, by virtue of the construction of the harness, is disposed forward of the fish lure body; (e) to provide such a fish lure wherein the fish hooks are secured in spaced relation to the lure body on opposite sides and at the end thereof, and wherein the assembly is such that such hooks are positioned in operation in the general plane of the lure body, as contrasted with projecting therebelow: (f) to provide such a lure which can withstand relatively large forces and loads under varying operating conditions, but which does not transfer any of such loads or forces to the body portion thereof; (g) to provide such a lure wherein the body portion can be formed of any suitable material, but is preferably formed from an elastomeric material so as to be at least somewhat compressible; (h) to provide such a fish lure wherein the body portion thereof may be formed by conventional plastic molding processes, and wherein the harness portion thereof may be formed by a simple stamping operation; and (i) to provide such a fish lure which is adapted to permit the fisherman to carry a plurality of different lure bodies, and but a single harness.

The invention lies in the construction, arrangement, and combination of the various parts and portions of the assembly as explained more fully in the following detailed description. The invention will be better understood, and objects other than those specifically set forth above will become apparent, when consideration is given to such description which refers to the annexed drawing presenting the preferred and illustrative embodiment of the invention. In the drawing:

FIGURE 1 is a plan view of a fish lure constructed in accordance with the present invention, FIGURE 2 is a side view of the fish lure shown in FIGURE 1, FIGURE 3 is a plan view, partially in section, of the lure shown in FIGURES 1 and 2, however, FIGURE 3 presents the components of the lure in the position which they would occupy during one stage of an assembly operation, FIGURE 4 is a plan view, partially in section, of the body section of a lure constructed in accordance with the present invention, FIGURE 5 is a side view, also partially in section, of the body portion shown in FIGURE 4, FIGURE 6 is a side view of the fish hook harness incorporated in a lure constructed in accordance with the present invention, FIGURE 7 is a rear end view of the lure body shown in FIGURES 4 and 5, and FIGURE 8 is a front end view of the lure body shown in FIGURES 4 and 5.

If reference is now made to the various figures of the drawing, it will be noted that the fishing lure is generally designated by the numeral 2. Such lure comprises the combination of a body 4, a hook harness 6, and a plurality of fish hooks carried by the harness 6. The hooks are designated by the numeral 8, and comprise standard tri-prong-type hooks. While this particular type of hook is preferred, and has proved to be most effective, it should be understood that the particular form of the fish hooks per se forms no part of the instant invention.

The body 4 of the lure comprises, as shown in FIGURES 4 and 5, a forward end portion generally designated by the numeral 10 and a rear portion generally designated by the numeral 12. A passageway 14 which is preferably rectangular in shape as shown in FIGURES 4, 5, and 8 extends longitudinally through the front portion 10 of the lure body. The rear portion of the lure body is integral with the forward portion and comprises, as best shown in FIGURE 5, an upper section 16 and a lower section 18 which are disposed on opposite sides of a slot 20 extending between and opening on opposite sides and the rear of the body 4. The slot 20 is longitudinally aligned with the passageway 14, and the rear end of the forward portion 10 defines the forward terminal wall 22 of the slot 20. With this construction, the slot 20 is contiguous with the passageway 14, and the wall 22 forms, in essence, abutments which comprise the forward end of the slot 20 and extend on opposite sides of the passageway 14.

The body 4 of the lure may be made of any suitable plastic material, of wood, or even of light-weight metal if desired. Moreover, the same may be suitably decorated in any manner so as to present an attraction for a fish. It has been found, however, that improved results are obtained when the body portion 4 is made of a compressible material. The main purpose of providing for compressibility is to allow a fish to compress the body when it bites, so that the fish will actually "bite hard" on the hooks without warning. This condition is to be distinguished from the condition realized with a hard body whereby the fish realizes his mistake as soon as he contacts the hardwood or plastic and is not always hooked.

Of course, the body should be sufficiently light in weight to permit its flotation at a suitable level and should be so designed that it is not affected by salt water or the like. Preferably, the body is formed from natural sponge rubber, synthetic sponge rubber, e.g. butadiene-styrene copolymer, or sponge urethane, e.g. a sponge urethane made from LG56 and toluene diisocyanate (LG56 is glycerine-propylene oxide adduct having a molecular weight of about 3000).

The fish hook harness 6, as best shown in FIGURE 3, comprises a flat metal body having an elongate central section 30 and wing projections 32(a) and 32(b) extending from opposite sides of the central section intermediate the ends of the central section. The central section 30 is bar-like, and the wings are preferably generally triangular in shape as shown. It is to be understood that while the harness has been described as comprising separate sections, the invention contemplates that such harness be formed from a single flat piece of sheet stock by stamping so that the various sections are integral parts of a single component.

The forward portion 30(a) of the central section 30 extends forward to the wing projections 32(a) and 32(b) and is adapted to extend through the passageway 14. In FIGURE 3 the harness 6 is shown as being inserted in the body portion 4 of the lure, and the forward portion 30(a) of the central section of the harness 6 is shown as being passed partially through the passageway 14. If the body portion 4 is held stationary, and the harness 6 is moved to the right as shown in FIGURE 3, then the construction is such that ultimately the forward edges 33(a) and 33(b) of the wings 32(a) and 32(b) engage the wall 22. The harness and body portion are then assembled in their operating positions, and by reference to FIGURES 1 and 2, it will be noted that the tip 30(t) of the forward portion 30(a) of the harness projects beyond the forward end of the body 4. Such tip 30(t) has a suitable aperture 40 therein adapted to receive the loop portion of a conventional snap-fastener 42.

In the assembled condition, the rear end of the central section of the harness 6 projects beyond the rear end of the body 4 so that the tip 30(r) is exposed. Moreover, the wing projections 32(a) and 32(b) are so dimensioned that the outer tips thereof project beyond opposite sides of the body portion 4. Of course, it should be apparent that the harness is inserted in the body, or the body is inserted on the harness by sliding the harness within the slot 20 so that the forward portion 30(a) of the central section thereof passes through the passageway 14. Preferably, the passageway 14 is dimensioned to releasably but snugly receive the portion 30(a) of the harness, and the slot 20 is dimensioned so that the remaining portions of the harness are snugly received therein.

The harness is maintained centrally of the body portion by virtue of the central disposition of the slot 20, as well as by virtue of the central disposition of the passageway 14, and cooperation of such passageway with the forward portion of the harness.

The tips of the respective wing portions, and the rear tip 30(r) of the central section of the harness are all provided with suitable apertures 46, 48, and 50 respectively whereby the loop ends 8' of the fish hooks can be passed through such aperture and then soldered closed so as to pivotally secure the fish hooks to the harness. When the assembly is completed, as shown in FIGURE 1, the hooks are disposed on opposite sides of the body in spaced relation to the body and the connection thereof with the body is made centrally so that the hooks extend generally along the body, as opposed to depending from the underside thereof.

It should be noted that when a fish strikes or engages any of the hooks, all forces are transmitted from the hooks through the harness 6 and to the line 100 which is coupled in any suitable conventional manner with the snap fastener 42. Absolutely no forces are transmitted to the line through the body, and the body being formed as an integral piece, and having no forces applied thereto through the harness, is not subject to damage or deterioration.

In the event it is desired to provide a lure of different appearance, after the harness has been assembled with one lure body, then it is only necessary to uncouple the standard snap connector 42, or fastening means, and slide the harness from the body with which it previously cooperated. Thereafter, the harness can be disposed within a different body having the appearance desired, and the fastening means 42 can again be passed through the aperture 40 to removably secure the body on the harness. This permits the fisherman to carry but a single harness and a plurality of bodies, and eliminates the common problems encountered in the tangling of hooks of respective lures and the like. Moreover, by virtue of the connection of the hooks with the harness, there is no tendency for the hooks to become disconnected from the lure itself.

While the harness 6 can be formed from a variety of materials, preferably the same is formed from a non-corrosive metal, such as, for example, aluminum. However, it will be understood that various other materials may be used with equal facility if desired.

Having read the foregoing detailed description of the illustrative and preferred embodiments of the invention, it should be apparent that the objects set forth at the outset of this specification have been successfully achieved. Various modifications other than those suggested hereinabove may occur to those of ordinary skill in the art after reading such description, and accordingly,

What is claimed is:

1. A fishing lure comprising, in combination, a body, a hook harness, and fish hooks carried by said harness, said body having a forward end portion with a passageway extending longitudinally therethrough, and a rear portion integral with said forward portion and having upper and lower sections disposed on opposite sides of a slot extending between and opening on opposite sides and the rear end of said body, said slot being longitudinally aligned with said passageway, the rear end of said forward end portion defining the forward terminal wall of said slot, said harness comprising a flat metal body having an elongate main longitudinal section and wing projections extending from opposite sides of said main longitudinal section intermediate the ends of said main longitudinal section, the portion of said main longitudinal section extending forward of said wing projections extending through said passageway and having a front tip projecting beyond the forward end of said body, said wing projections and the other portions of said main longitudinal section being disposed in said slot, said wing projections engaging said wall and having tips projecting beyond opposite sides of said body, said main longitudinal section having a rear tip projecting beyond the rear end of said body, at least one of said fish hooks being attached to each of said tips of said wings and to said rear tip of said main longitudinal section, said front tip of said main longitudinal section having an aperture therein adapted to releasably receive a line fastening means.

2. A fishing lure comprising, in combination, a unitary body, a hook harness, and fish hooks carried by said harness, said body having a forward end portion with a generally rectangular passageway extending centrally therethrough, and a rear portion having upper and lower sections disposed on opposite sides of a slot extending between and opening on opposite sides and the rear end of said body, said slot being longitudinally aligned with said passageway, the rear end of said forward end portion defining the forward terminal wall of said slot, said harness comprising a flat body having an elongate bar-like main longitudinal section and wing projections extending from opposite sides of said main longitudinal section intermediate the ends of said main longitudinal section, the portion of said main longitudinal section extending forward of said wing projections extending through said passageway and having a front tip projecting beyond the forward end of said body, said wing projections and the other portions of said main longitudinal section being disposed in said slot, each of said wing projections being generally triangular and having one edge engaging said wall and tips projecting beyond opposite sides of said body, said main longitudinal section having a rear tip projecting beyond the rear end of said body, said fish hooks being attached to said tips of said wings in spaced relation to said body and to said rear tip of said main longitudinal section, said front tip of said main longitudinal section having an aperture therein adapted to receive a line fastening means, said body removably receiving said harness.

3. A fishing lure comprising, in combination, an elastomeric body, a hook harness, and fish hooks carried by said harness, said body being generally bullet shaped and having a forward end portion with a rectangular passageway extending centrally therethrough, and a rear portion having upper and lower sections disposed on opposite sides of a horizontal slot extending between and opening on opposite sides and the rear end of said body, said slot being longitudinally aligned with said passageway, the rear end of said forward end portion of said body defining the forward terminal wall of said slot, said harness comprising a flat body having an elongate main section and wing projections extending from opposite sides of said main section intermediate the ends of said main section, the portion of said main section extending forward of said wing projection extending through said passageway and having a front tip projecting beyond the forward end of said body, said wing projection and the other portions of said main section being disposed in said slot, said wing projection engaging said wall and having tips projecting beyond opposite sides of said body, said main section having a rear tip projecting beyond the rear end of said body, at least one of said fish hooks being attached to each of said tips of said wing projection in spaced relation to said body and to said rear tip of said main section, said front tip of said main section having an aperture therein adapted to releasably receive a line fastening means, said body removably receiving said harness.

References Cited in the file of this patent
UNITED STATES PATENTS

| | | |
|---|---|---|
| 1,756,260 | Pflueger | Apr. 29, 1930 |
| 2,127,639 | Breuer | Aug. 23, 1938 |
| 2,516,039 | Wysack | July 18, 1950 |
| 2,618,096 | Wagner | Nov. 18, 1952 |